United States Patent
Celinski

(10) Patent No.: US 10,347,299 B2
(45) Date of Patent: Jul. 9, 2019

(54) METHOD TO AUTOMATE MEDIA STREAM CURATION UTILIZING SPEECH AND NON-SPEECH AUDIO CUE ANALYSIS

(71) Applicant: Loose Cannon Systems, Inc., San Francisco, CA (US)

(72) Inventor: Peter Celinski, San Francisco, CA (US)

(73) Assignee: Loose Cannon Systems, Inc., San Francisco, CA (US)

( * ) Notice: Subject to any disclaimer, the term of this patent is extended or adjusted under 35 U.S.C. 154(b) by 0 days.

(21) Appl. No.: 16/115,276

(22) Filed: Aug. 28, 2018

(65) Prior Publication Data

US 2018/0374512 A1   Dec. 27, 2018

Related U.S. Application Data

(63) Continuation-in-part of application No. 15/190,062, filed on Jun. 22, 2016.

(60) Provisional application No. 62/552,784, filed on Aug. 31, 2017.

(51) Int. Cl.
| | |
|---|---|
| *G11B 27/32* | (2006.01) |
| *G10L 15/18* | (2013.01) |
| *G11B 27/34* | (2006.01) |
| *G11B 27/031* | (2006.01) |
| *G10L 15/22* | (2006.01) |

(52) U.S. Cl.
CPC .......... *G11B 27/32* (2013.01); *G10L 15/1815* (2013.01); *G10L 15/22* (2013.01); *G11B 27/031* (2013.01); *G11B 27/34* (2013.01)

(58) Field of Classification Search
CPC ....... G11B 27/031; G11B 27/32; G11B 27/34; G10L 15/1815; G10L 15/22
See application file for complete search history.

(56) References Cited

U.S. PATENT DOCUMENTS 6,636,238 B1 *  10/2003  Amir ..................... G06F 16/685
                                                     715/730

* cited by examiner

*Primary Examiner* — Raymond S Dean
(74) *Attorney, Agent, or Firm* — Innovation Counsel LLP

(57) ABSTRACT

A method to automate media stream curation implements verbal and non-verbal audio cue analysis of an audio track recorded contemporaneously with a media stream. The media stream may be a video stream or an audio stream. The audio track is recorded contemporaneously with the media stream using a recording device separate from the media recording device used to record the media stream. Audio cue analysis of the audio track is performed to detect for audio cues which indicate the locations or timestamps associated with elements of interest. The identified elements of interest are then used to extract segments of the media stream to form a curated media stream containing clips associated with the elements of interest.

20 Claims, 9 Drawing Sheets

METHOD TO AUTOMATE MEDIA STREAM CURATION UTILIZING SPEECH AND NON-SPEECH AUDIO CUE ANALYSIS

CROSS REFERENCE TO RELATED APPLICATIONS

This application claims priority to U.S. Provisional Patent Application No. 62/552,784, entitled METHOD TO AUTOMATE VIDEO STREAM CURATION UTILIZING SPEECH AND NON-SPEECH AUDIO CUE ANALYSIS, filed Aug. 31, 2017, which is incorporated herein by reference for all purposes.

This application is a continuation-in-part of co-pending U.S. patent application Ser. No. 15/190,062, entitled PORTABLE GROUP COMMUNICATION DEVICE AND METHOD OF USE, filed Jun. 22, 2016, which is incorporated herein by reference for all purposes.

The present application is related to commonly assigned U.S. patent application entitled PORTABLE GROUP COMMUNICATION DEVICE AND METHOD OF USE, filed Jun. 22, 2016, having at least one common inventor thereof, having patent application Ser. No. 15/190,111, now U.S. Pat. No. 10,003,625, issued on Jun. 19, 2018, which patent application is incorporated herein by reference in its entirety.

The present application is related to commonly assigned U.S. patent application entitled PORTABLE GROUP COMMUNICATION DEVICE HAVING AUDIO PLAYBACK AND/OR PHONE CALL CAPABILITY, filed Jun. 22, 2016, having at least one common inventor thereof, having patent application Ser. No. 15/190,066, which patent application is incorporated herein by reference in its entirety.

FIELD OF THE INVENTION

The invention relates to audio and video processing and, in particular, to systems and methods to curate audio and video streams using audio cues.

BACKGROUND OF THE INVENTION

Devices are now widely available for users to record video and audio of people or events. Often, the user has recorded long segments of video or audio, of which certain portions may be of particular interest. Typically, the user has to review or scroll through the entire video or audio recording to locate the portions of particular interest. This is a time consuming and burdensome process and users with large amount of video or audio recordings face difficulties in processing the recordings to obtain useful portions.

BRIEF DESCRIPTION OF THE DRAWINGS

Various embodiments of the invention are disclosed in the following detailed description and the accompanying drawings.

DETAILED DESCRIPTION

Figure 1:
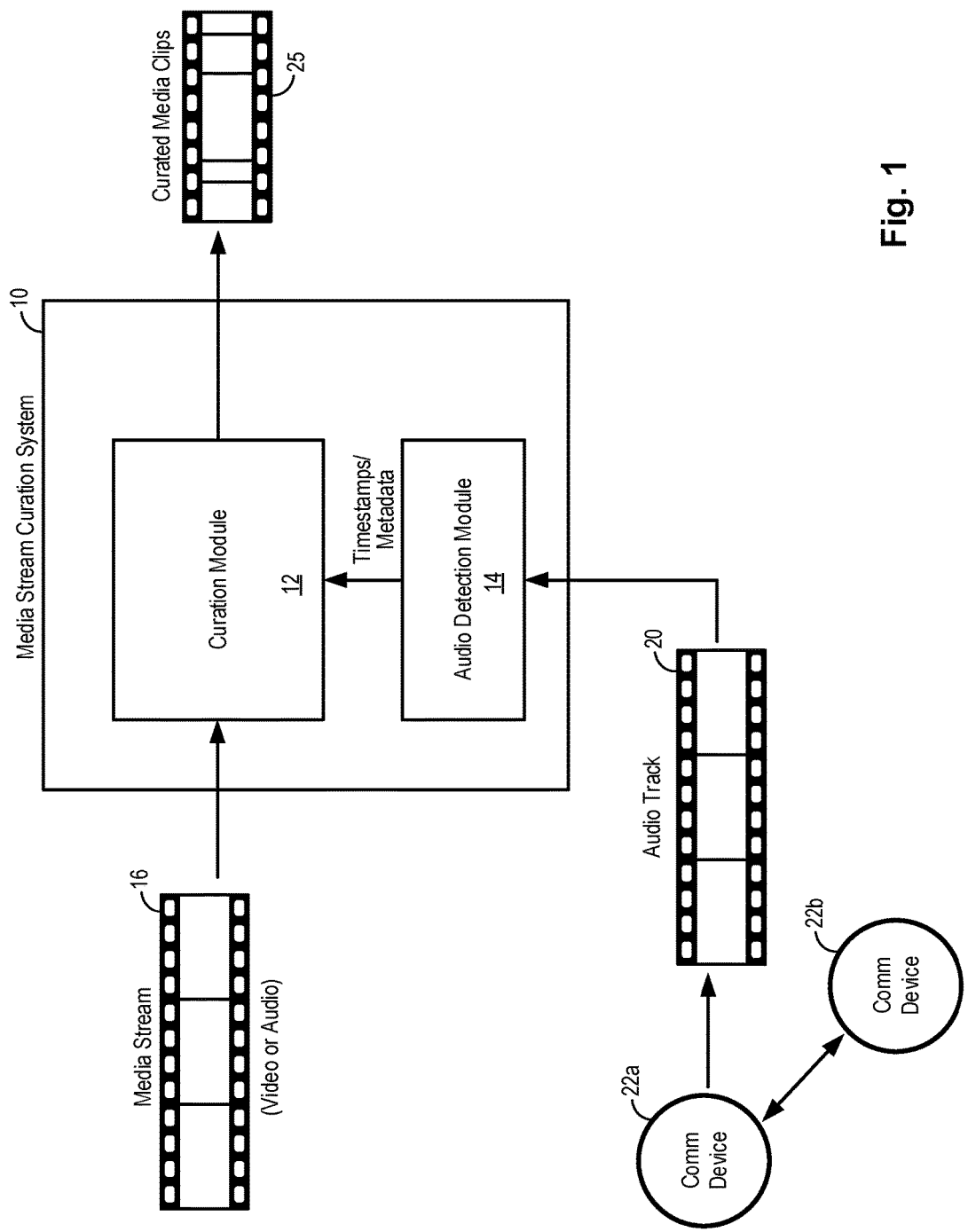
FIG. 1 is a block diagram illustrating a media stream curation system implementing the media stream curation method in some embodiments of the present invention.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a method to automate media stream curation implements verbal and non-verbal audio cue analysis of an audio track recorded contemporaneously with a media stream. The media stream may be a video stream or an audio stream. The audio track is recorded contemporaneously with the media stream using a recording device separate from the media recording device used to record the media stream. Audio cue analysis of the audio track is performed to detect for audio cues which indicate the locations or timestamps associated with elements of interest. The identified elements of interest are then used to extract segments of the media stream to form a curated media stream containing clips associated with the elements of interest.

In some embodiments, the audio track is recorded using one or more portable communication devices that are configured to enable group communication among a group of the portable communication devices. In some embodiments, the portable communication devices are implemented as described in copending and commonly assigned U.S. patent application Ser. No. 15/190,062, entitled PORTABLE GROUP COMMUNICATION DEVICE AND METHOD OF USE, which application is incorporated by reference in its entirety. As described in the '062 application, the portable communication device enables full-duplex radio communication with another one of the portable communication devices that have joined a group. Details of the portable communication device and the operation methods are described in the '062 patent application.

In some embodiments, the media stream may be a video stream recorded by a video camera, such as a GoPro camera. In some examples, the video stream may be recorded activities of a group of users, such as skiing or surfing. In another example, the video stream may also be a live performance recorded by a user or a group of users. In other embodiments, the media stream may be an audio stream recorded by a video camera or a voice recorder. The audio stream may be a recording of activities such as a retail sales interaction between a sales person and a customer.

The media stream curation method of the present invention can be advantageously applied to process lengthy media recordings to quickly identify segments of the recordings that may be of interest to the users. An example use case is to enable users of video cameras such as GoPro cameras or similar devices to quickly and easily produce curated short video clips from their video recordings, so that those clips may be stored or shared on social media or by other methods. The challenges faced by users following capture of video content are the time required to review and locate the interesting segments within long recordings and the complexity in using conventional video editing software.

In embodiments of the present invention, the media stream curation method is implemented to automatically locate segments of potential interest in a media stream by analyzing the speech and other vocal cues in an audio track recorded by a device at the same time as the recording of the media stream. In some embodiments, the audio track is recorded in the proximity of the recording of the media stream. In some embodiments, the audio track is recorded by a portable communication device, such as the portable communication device described in the aforementioned '062 application. The audio track may record the voice of the user of the portable communication device or the conversation of the user with other group members in a group of the portable communication devices. For example, users of the portable communication devices that have joined a group may be participating in a sport such as skiing or cycling. One or more portable communication devices may provide the audio track while a video camera, such as a GoPro camera, attached to one member of the group may be making a video recording of the group's activity. The audio cues may include direct verbal statements such as "that was great!" or other vocal or audible expressions of note including excitement, pleasure, fear or other expressions conveyed via yelling, applause, profanity, cheering, screaming or others. Once the audio cues are located, these segments of interest in the video recording may then be more quickly and easily processed, arranged, edited or combined in software to produce, manually or automatically, a longer composition as the final curated video.

The media stream curation method enables users of the portable communication devices to quickly and easily produce curated short clips of their video recordings, so that those clips may be stored or shared on social media or by other methods.

In another example, the media stream curation method may be used to analyze voice conversations in commercial situations, where it may be useful to record the conversations and to process the recorded conversations for various purposes. One example purpose may be for training of sales staff in a retail environment. Another purpose may be to enable of analysis of events that led to an accident on a construction site.

FIG. 1 is a block diagram illustrating a media stream curation system implementing the media stream curation method in some embodiments of the present invention. Referring to FIG. 1, a media stream curation system 10 includes a curation module 12 and an audio detection module 14. The curation module 12 receives a media stream 16 to be processed. The media stream 16 may a video stream or an audio stream. The audio detection module 14 receives an audio track 20 to analyze for audio cues. The audio track 20 is an audio recording made separately from the media stream 16 but is made contemporaneously with the media stream 16. In some cases, the audio track 20 is an audio recording that is made contemporaneously with and in the proximity to the recording of the media stream 16.

In the present embodiment, the audio track 20 is illustrated as being recorded by a communication device 22a, which can be a portable communication device in the aforementioned '062 patent application. The portable communication device 22a may be operating on its own to record the user's voice. In that case, the audio track 20 may be a recording of the user's own speech. In other cases, the portable communication device 22a may be one device in a group of portable communication devices. For example, the portable communication device 22a may be in a group and communicating with a portable communication device 22b. In that case, the audio track 20 may be a recording of the conversation between users of devices 22a and 22b.

The audio detection module 14 analyzes the audio track 20 to detect for audio cues which may indicate segments of interest in the media stream. In some embodiments, the audio detection module 14 detects in the audio track 20 for verbal cues or speech audio cues, such as "beautiful jump" or "amazing." In other embodiments, the audio detection module 14 detects in the audio track 20 for non-verbal cues or non-speech audio cues, such as "wow" or "whoa" or other exclamation. The audio detection module 14 generates a set of timestamps and metadata associated with the detected audio cues. In one embodiment, each detected audio cue is represented by a pair of timestamps marking the start time and the end time of the audio segment associated with the detected audio cue. Each detected audio cue is also provided with metadata to describe the nature of the detected audio cue. For example, the metadata may indicate the type of audio cues, such as an expression of excitement, or an expression of surprise, or other indications or descriptions of the detected audio cue. The timestamps and associated metadata are provided to the curation module 12.

The curation module 12 receives the media stream 16 and edits the media stream 16 using the timestamps and metadata information provided by the audio detection module 14. In one embodiment, the curation module 12 extracts segments or clips of the media stream 16 using the timestamps and associated metadata information. The extracted media clips may be stitched or merged together to form the output media stream 25 being a curated media clips.

Figure 2:
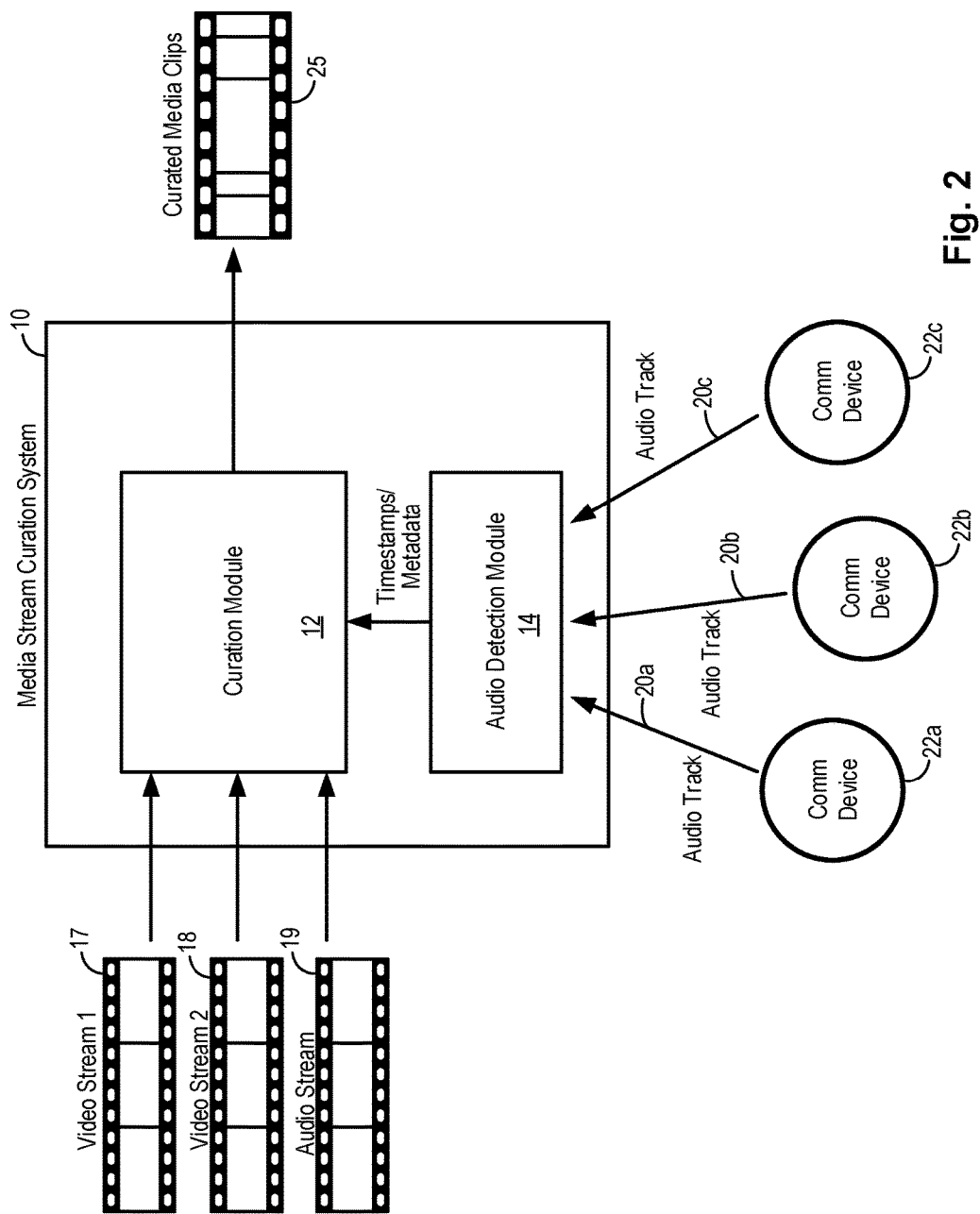
FIG. 2 is a block diagram illustrating the use of the media stream curation system in analyzing distributed recordings in some embodiments of the present invention.

FIG. 1 illustrates the use the media stream curation system for processing one media stream using a single audio track. In some embodiments, the media stream curation system can be applied to detect for audio cues from multiple audio tracks and to process multiple media streams. FIG. 2 is a block diagram illustrating the use of the media stream curation system in analyzing distributed recordings in some embodiments of the present invention. Referring to FIG. 2, the media stream curation system 10 including the curation module 12 and the audio detection module 14 is configured to analyze a set of distributed audio recordings. In particular, the audio detection module 14 may receive multiple audio tracks 20a to 20c from multiple sources. For example, each audio track may be provided by a respective portable communication device 22a-c. The multiple audio tracks 20a to 20c are created by separate recording devices but are created contemporaneously with one or more media streams to be curated. The audio tracks 20a to 20c may be made in close physical proximity to each other or may be made over a large distance. The audio tracks 20a to 20c may be made in close physical proximity to the recording of the media streams or may be made at locations away from the recording of the media stream.

The audio detection module 14 analyzes the set of audio tracks 20a to 20c to detect for audio cues across the set of audio tracks. The audio detection module 14 generates a set of timestamps and associated metadata in response to speech or non-speech audio cues detected in the set of audio tracks 20a to 20c. As described above, in some embodiments, each audio cue is denoted by a pair of timestamps associated with the start time and the end time of the audio segment associated with the detected audio cue. Each audio cue is also denoted by metadata describing the nature of the detected audio cue.

In the present embodiment, the media curation system 10 can be configured to process multiple media streams 17-19 based on the audio cue analysis of one or more audio tracks. The multiple media streams can be one or more video streams, one or more audio streams, or any combination thereof. In the present illustration, the media stream curation system 10 receives a media stream 17 being a first video stream, a media stream 18 being a second video stream, and a media stream 19 being an audio stream. The media streams 17-19 are recorded contemporaneously and in the same time duration as the audio tracks 20a-c. The media streams 17-19 are recorded using separate recording devices from the recording devices used to record the audio tracks 20a-c. However, the media streams 17-19 may be recorded using the same or separate recording devices. For example, the media streams 17-19 can be separate recordings of the same event. The audio tracks 20a-c are separate audio recording of the same event.

The curation module 12 receives the multiple media streams 17-19 and edits the media streams 17-19 using the timestamps and metadata information provided by the audio detection module 14. In one embodiment, the curation module 12 extracts segments or clips of the media streams 17-19 using the timestamps and associated metadata information. The extracted media clips may be stitched or merged together to form the output media stream 25 being a curated media clips.

Figure 3:
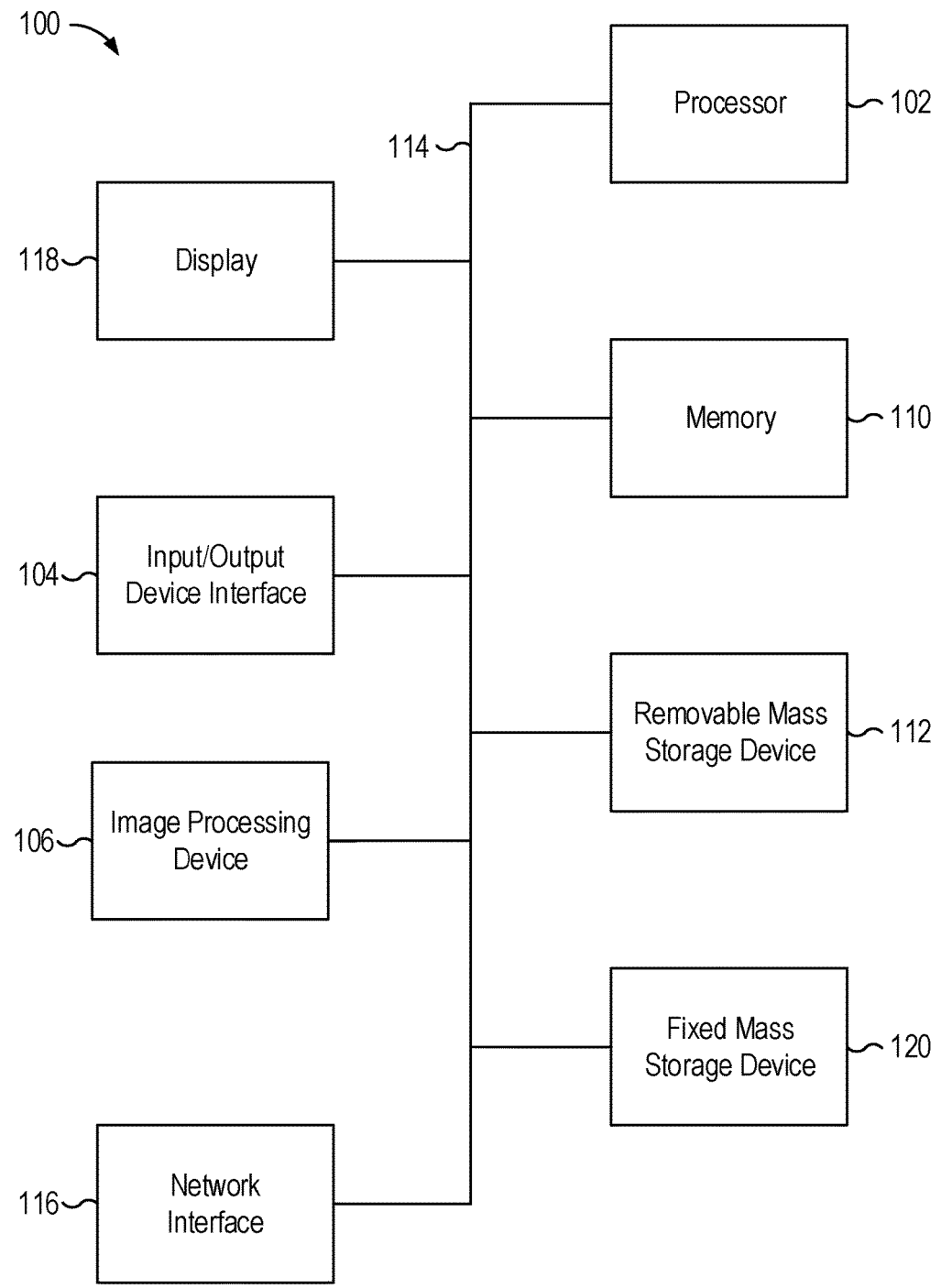
FIG. 3 is a functional diagram illustrating a programmed computer system for implementing the media stream curation method in accordance with embodiments of the present invention.

FIG. 3 is a functional diagram illustrating a programmed computer system for implementing the media stream curation method in accordance with embodiments of the present invention. As will be apparent, other computer system architectures and configurations can be used to perform the described media stream curation method. Computer system 100, which includes various subsystems as described below, includes at least one microprocessor subsystem (also referred to as a processor or a central processing unit (CPU) 102). For example, processor 102 can be implemented by a single-chip hardware processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, etc.). Using instructions retrieved from memory 110, processor 102 controls the reception and manipulation of input data received on an input device (e.g., image processing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

The computer system 100 may include an optional removable mass storage device 112 providing additional data storage capacity for the computer system 100. The computer system 100 is coupled either bi-directionally (read/write) or uni-directionally (read only) to processor 102. The computer system 100 may further include an optional fixed mass storage 120 to provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, the image processing device 106, as well as other subsystems and devices. For example, image processing device 106 can include a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interfaces for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information often represented as a sequence of instructions to be executed on a processor can be received from and outputted to another network. An interface card or similar device and appropriate software implemented by (e.g., executed/performed on) processor 102 can be used to connect the computer system 100 to an external network and transfer data according to standard protocols. For example, various process and method embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system 100 shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detect user inputs and display outputs to the user). In addition, bus 114 is illustrative of any interconnection scheme serving to link the subsystems. Other computer architectures having different configurations of subsystems can also be utilized.

In embodiments of the present invention, the media stream curation method is implemented in a computer system, such as the computer system 100 of FIG. 3. In some embodiments, the computer system is a computer system local to the user. In other embodiments, the computer system may be a computer system on the cloud, or a cloud computing system. The user may access the cloud computing system through a data network to implement the media stream curation method of the present invention. In one embodiment, the audio cue analysis is implemented in the cloud using commercially available tools such as Google Cloud Speech API or Amazon Voice Service or others, or some combination thereof.

In some embodiments, the media stream curation method is implemented in a portable communication device, such as the portable communication device described in the '062 patent application. In particular, the media stream curation method may be implemented in the digital processor of the portable communication device to allow the user to process and curate videos captured using another recording device.

Figure 4:
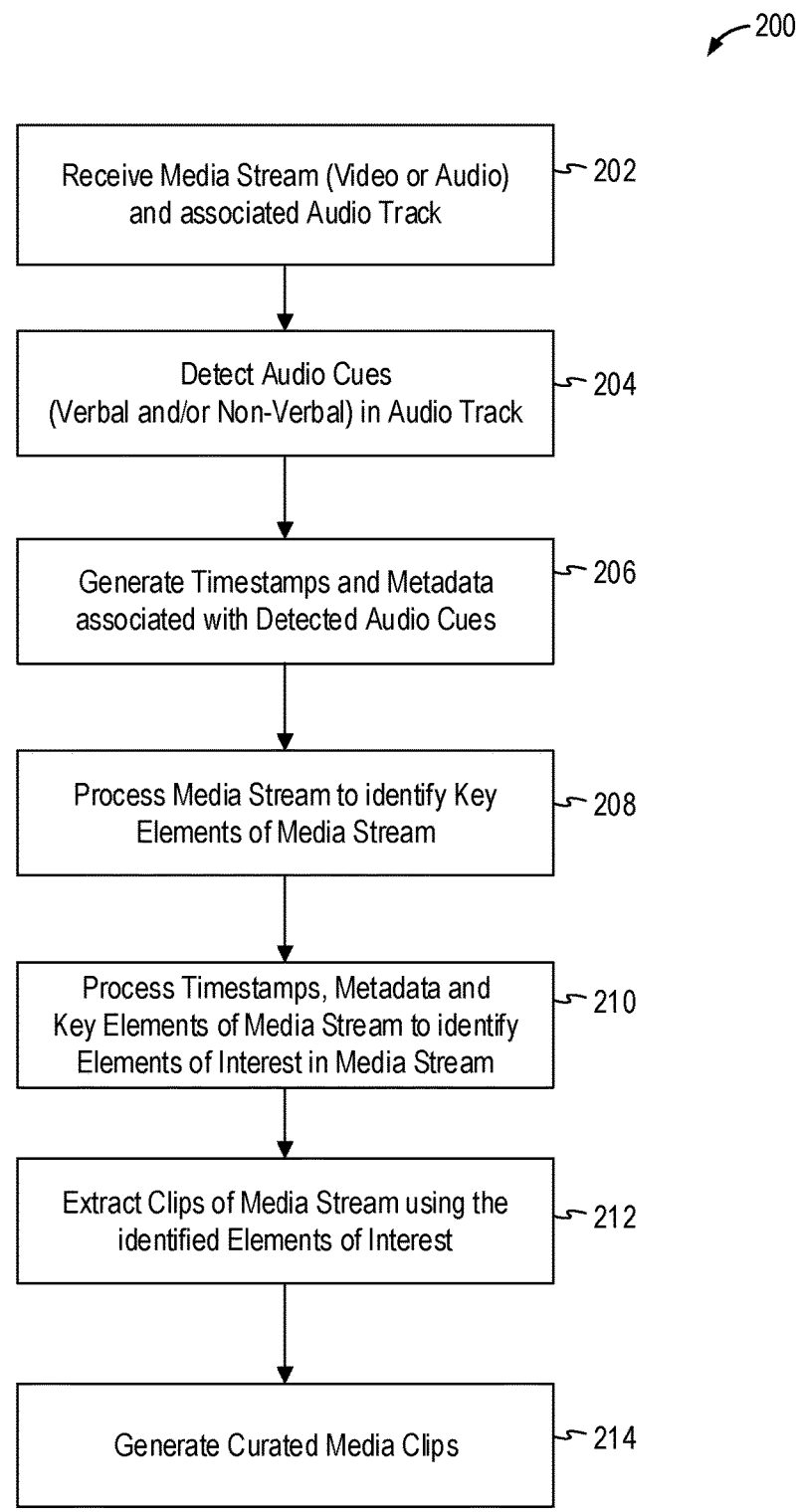
FIG. 4 is a flowchart illustrating the media stream curation method in embodiments of the present invention.

FIG. 4 is a flowchart illustrating the media stream curation method in embodiments of the present invention. Referring to FIG. 4, a media stream curation method 200 receive at least one media stream and at least one associated audio track (202). The media stream can be a video stream or an audio stream. The associated audio track is an audio recording made contemporaneously with the media stream using a recording device separate from the recording device used to record the media stream. The method 200 detects for one or more audio cues in the audio track (204). The audio cues can be verbal cues and/or non-verbal cues. The method 200 generates timestamps and associated metadata for the detected audio cues (206). In particular, for each detected audio cue, the method 200 generates a pair of timestamps indicating the start time and the end time of the detected audio cue. The method 200 also provide metadata describing the detected audio cue, such as the type or nature of audio cue.

The method 200 then processes the media stream to identify key elements of the media stream (208). In the present description, key elements of the media stream refer to significant visual content in a video stream, such as an object in the foreground as opposed to being in the background of the images. For example, in a video stream of a wildlife scene, a tiger or a polar bear will be identified as key elements of the media stream. Furthermore, in an audio stream, significant audio content may be considered key elements, such as the sound of a siren or the sound of an explosion.

With the audio cues in the audio track detected and the key elements in the media stream identified, the method 200 proceeds to process the timestamp and metadata information with the key elements identified in the media stream to identify elements of interest in the media stream (210). In some embodiments, the method 200 uses machine learning to classify detected cues using the metadata information and in correlation with the key media elements identified. The method 200 determines one or more elements of interest based on the classification of the detected cues and the correlation with the key media elements. In some embodiments, each element of interest is represented by a pair of timestamps, indicating the start time and the end time associated with the segment of media stream of interest and associated metadata describing the characteristics, such as the type and nature, of the elements of interest.

The method 200 then proceeds to process the media stream using the identified elements of interest (212). For example, the method 200 may extract clips of the media stream using the timestamp and metadata information associated with the identified elements of interest. The method 200 then generates the curated media clips, such as by stitching together the extracted media clips into a curated media stream (214).

Figure 5:
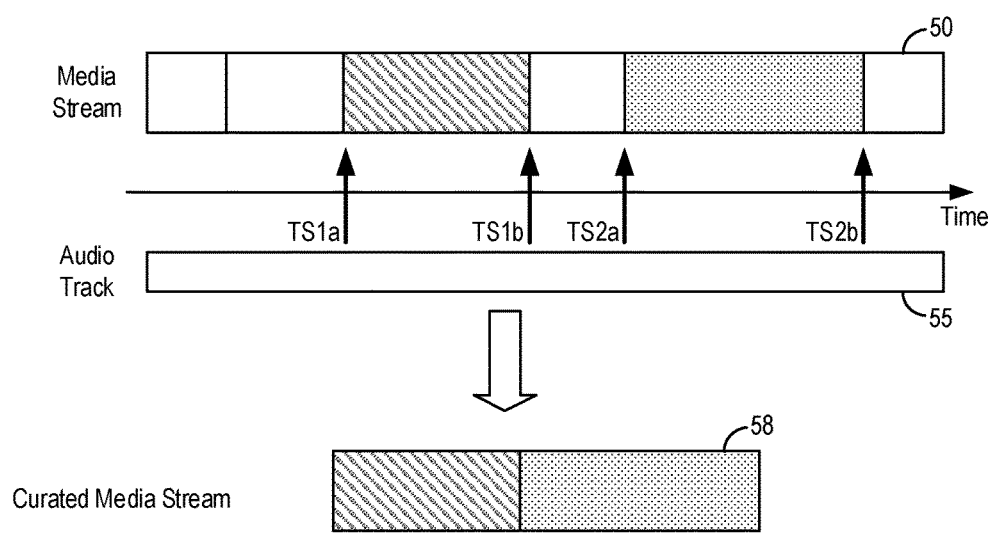
FIG. 5 is a diagram illustrating the operation of the media stream curation method in some examples.

FIG. 5 is a diagram illustrating the operation of the media stream curation method in some examples. Referring to FIG. 5, a media stream 50 containing video and/or audio content and an associated audio track 55 are processed by the media stream curation method of the present invention. The audio track 55 is analyzed to detect for audio cues associated with elements of interest in the media stream 50. For example, two segments of content from the media stream 50 are identified to be of interest. The segments of interest are identified by timestamp pairs TS1a/TS1b and TS2a/TS2b. The media stream curation method uses the timestamp information to extract the relevant clips from the media stream 50. The media stream curation method generates the curated media stream 58 by stitching together the extracted media clips.

Figure 6:
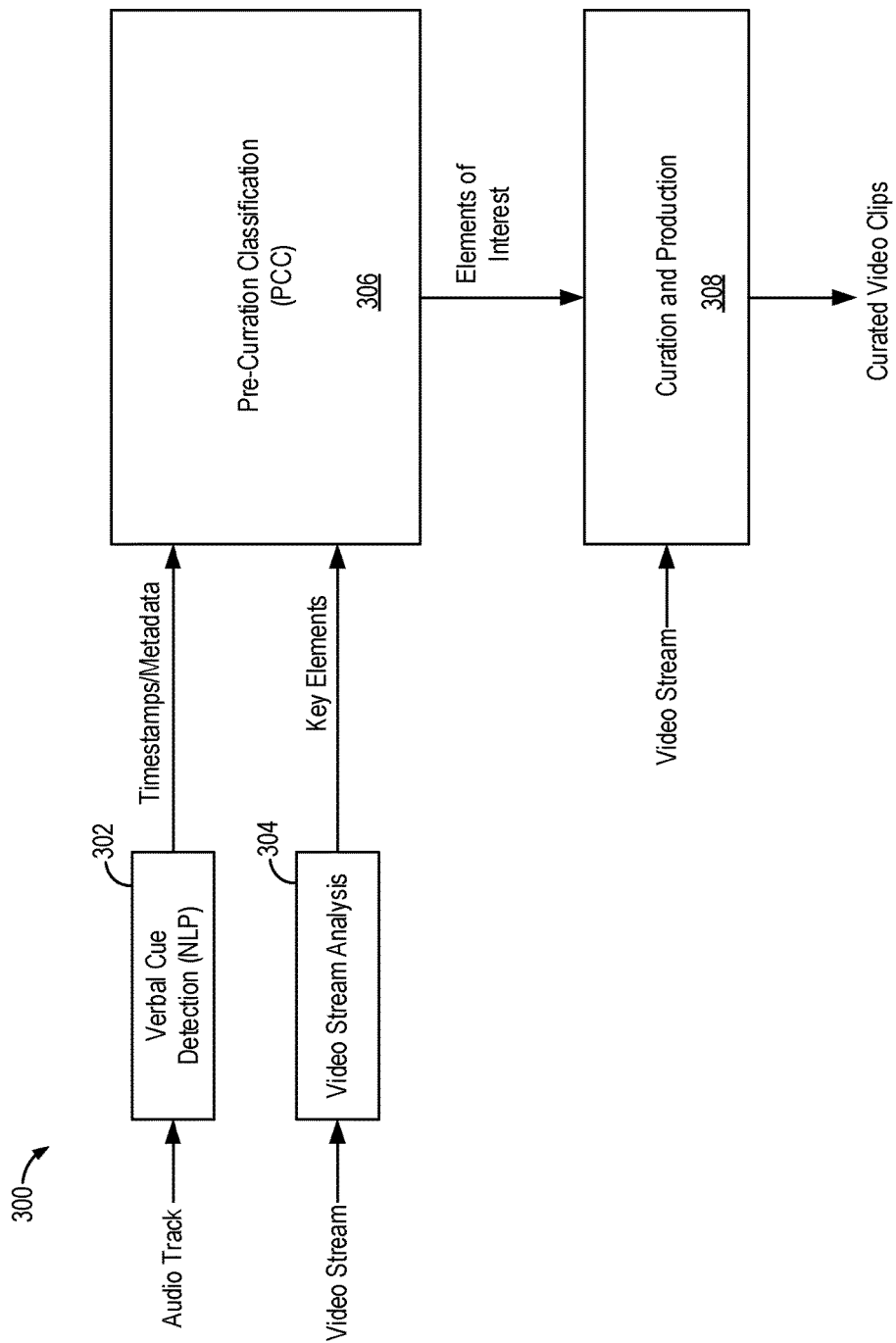
FIG. 6 is a functional diagram of the media stream curation method in a first embodiment.

FIG. 6 is a functional diagram of the media stream curation method in a first embodiment. Referring to FIG. 6, a media stream curation method 300 is configured to receive a single video stream as the media stream to be curated and a single audio track as the associated audio track. As described above, the associated audio track is recorded contemporaneously with the video stream using a recording device separate from the video recording device used to record the video stream.

The audio track is provided to a verbal cue detection module 302 configured to implement natural language (speech) processing (NLP), including semantic and discourse analysis, of single audio track to identify the presence of verbal cues relevant to the single video stream. The verbal cue detection module generates timestamps and metadata associated with the detected verbal cues. For example, the verbal cue can be "this is beautiful" or "look at that."

Meanwhile, the video stream is provided to a video stream analysis (VSA) module 304 to recognize and classify key elements of the video stream. For example, the key elements can be a person or an animal in the foreground visual content.

In some embodiments, the outcomes of the natural language processing and video stream analysis are used iteratively to improve mutual outcomes on the basis of correlation between identified visual entities and speech cues.

The results of the verbal cue detection and the video stream analysis are provided to a pre-curation classification (PCC) module 306 which identifies video and speech elements of interest using the detected verbal cue and the identified key elements. In some embodiments, elements of interest are identified using a learning classifier based on a deep-learning model or other artificial intelligent learning methods or recognition system. The deep-learning model applies the learning classifier to classify the detected audio cues and the identified key elements to identify the elements of interest in the video stream. The deep-learning model may be previously trained using training data.

In some embodiments, the definition of what constitute "element of interest" will vary depending on the type of desired outcome for the curated video stream. For example, different classifiers may be used for different interest category. In one example, various interest categories may be provided for "adventure video", "social gathering video", "scenery video" and others. Each "interest category" may be provided with a dedicated classifier. Furthermore, in some embodiments, a classifier may be "hard coded" or fixed or the classifier may be trained through supervised, unsupervised or other methods of learning and training. The classifier may also evolve over time through unsupervised learning.

The Pre-Curation Classification module 306 generates one or more elements of interest. The identified elements of interest, represented as timestamp and metadata information, are provided to a curation and production module 308. In one example, the timestamp information may consist of a pair of timestamps indicating the start time and the end time associated with the element of interest and the metadata describes the characteristics of the element of interest, such as the type or the nature of the element of interest.

At the curation and production module 308, the video stream is processed on the basis of the output from the pre-curation classification module 306. In one example, the video stream is cut and video clips from the video stream are extracted. In another example, the extracted video clips may be augmented with audio that combines relevant speech elements and music based on the outcomes of the pre-curation classification module 306.

Figure 7:
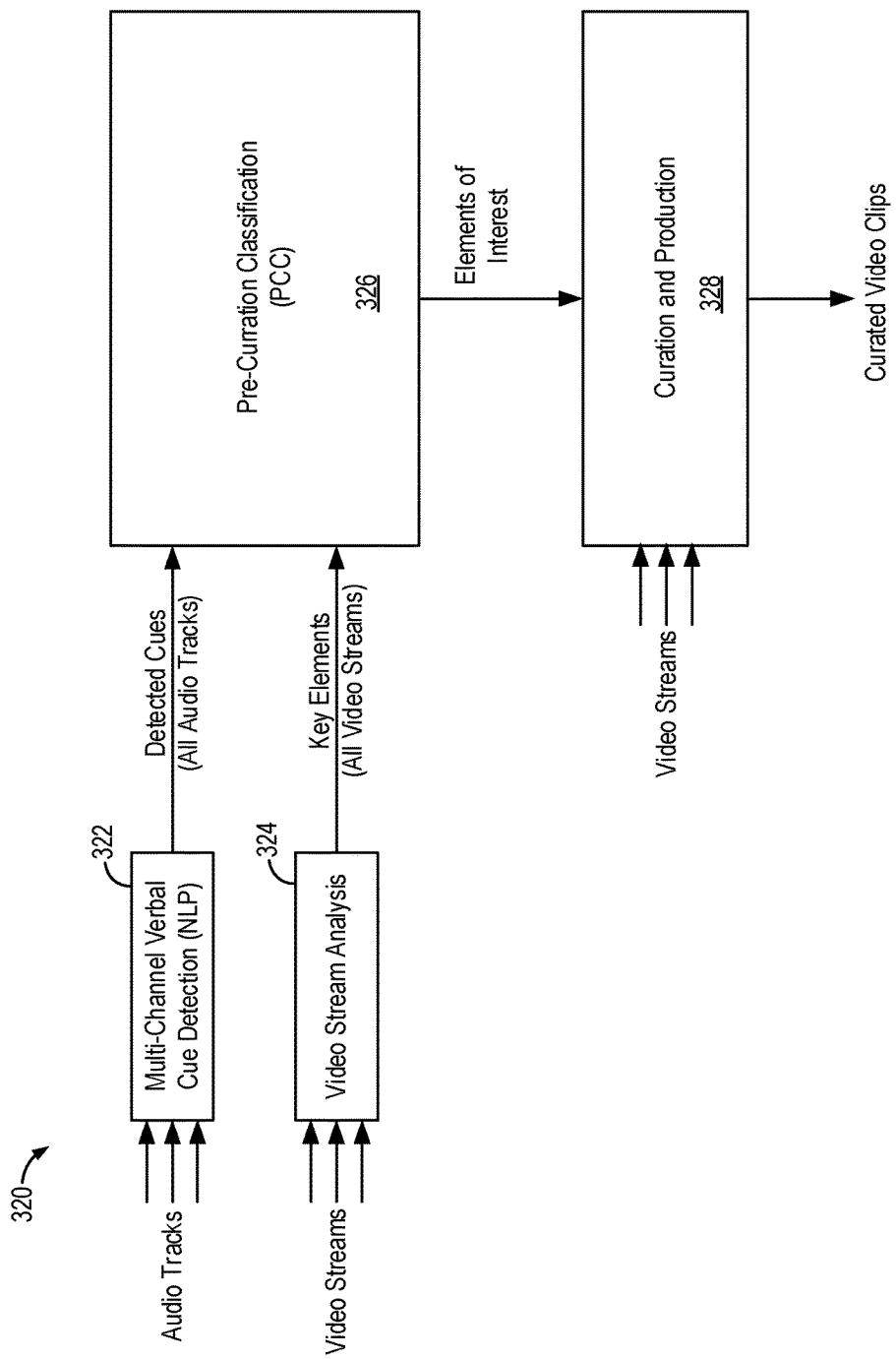
FIG. 7 is a functional diagram of the media stream curation method in a second embodiment.

In another embodiment, the media stream curation method is configured to handle multiple media streams and configured to analyze multiple audio tracks. FIG. 7 is a functional diagram of the media stream curation method in a second embodiment. Referring to FIG. 7, a media stream curation method 300 is configured to receive multiple video streams as the media streams to be curated and multiple audio track as the associated audio tracks. The associated audio tracks are recorded contemporaneously with the video streams using recording devices separate from the video recording devices used to record the video streams. The video streams are recorded contemporaneously with each other, such as separate video streams of the same event.

The audio tracks are provided to a multi-channel verbal cue detection module 322 configured to implement natural language (speech) processing (NLP), including semantic and discourse analysis, of single audio track to identify the presence of verbal cues relevant to the single video stream. The multi-channel verbal cue detection module generates timestamps and metadata associated with the detected verbal cues for each audio track. That is, the verbal cue detection is performed for each audio track individually. Meanwhile, the video stream is provided to a video stream analysis (VSA) module 324 to recognize and classify key elements of the video stream.

In some embodiments, the outcomes of the natural language processing and video stream analysis are used iteratively to improve mutual outcomes on the basis of correlation between identified visual entities and speech cues.

The results of the verbal cue detection across all audio tracks and the results of the video stream analysis across all video streams are provided to a pre-curation classification (PCC) module 326 which identifies video and speech elements of interest using the detected verbal cues and the identified key elements. In some embodiments, elements of interest are identified using a learning classifier based on a deep-learning model or other artificial intelligent learning methods or recognition system. More specifically, the classifier outcomes across all video streams are post-processed through a mutual-reinforcement/cross-correlation stage to identify elements of interest across all video streams. While PCC Cross-Correlation module 326 looks at PCC outcomes that are common across all of the video streams, the PCC Cross-Correlation module 326 equally considers and may include outcomes that are not common across the video streams but score highly in terms of (a) confidence of classification within a single video PCC context and (b) metric of speech focus, such as the extent/duration of related discourse.

The Pre-Curation Classification module 326 generates one or more elements of interest. The identified elements of interest, represented as timestamp and metadata information, are provided to a curation and production module 328. In one example, the timestamp information may consist of a pair of timestamps indicating the start time and the end time associated with the element of interest and the metadata describes the characteristics of the element of interest, such as the type or the nature of the element of interest.

At the curation and production module 328, the multiple video streams are processed on the basis of the output from the pre-curation classification module 326. In one example, the video stream is cut and video clips from the video stream are extracted. In another example, the extracted video clips may be augmented with audio that combines relevant speech elements and music based on the outcomes of the pre-curation classification module 326.

In other embodiments, the media stream curation method is configured to analyze audio tracks for non-speech cues or a combination of speech and non-speech cues. In particular, in some embodiments, non-verbal audio cue extraction is achieved using sound signal processing combined with a learning classifier, based on a deep-learning model or other artificial intelligence learning methods, to detect and recognize sounds of "interest" related to an audio track. Sounds of "interest" may include non-speech human sounds (such as human laughter), animal sounds (such as a roar), or a range of other sounds (such as a splash, bang, crash, explosion, or other). For example, the deep-learning model applies the learning classifier to classify detected sounds in the audio tracks as non-verbal audio cues. The deep-learning model may be previously trained using training data.

In some embodiments, the definition of what constitute "element of interest" will vary depending on the type of desired outcome for the curated video stream. For example, different classifiers may be used for different interest category. In one example, various interest categories may be provided for "adventure video", "social gathering video", "scenery video" and others. Each "interest category" may be provided with a dedicated classifier. Furthermore, in some embodiments, a classifier may be "hard coded" or fixed or the classifier may be trained through supervised, unsupervised or other methods of learning and training. The classifier may also evolve over time through unsupervised learning. The classifier may take as input information about likely contents in the video scenes.

In one embodiment, the non-speech cue analysis is implemented with the ability to detect and recognize sounds of "interest" by varying the classifier as a function of visual content analysis, curation and production objectives. This may be done by switching between classifiers, or by using a single complex classifier capable of reliable recognition across the objectives or other methods. Furthermore, in another embodiment, the non-speech cue analysis is implemented with the ability to take into account information about the video content as a way of improving the non-verbal audio cue recognition. For example, information such as "video contains tiger" may enable better recognition of tiger roar sounds, even in noisy environments.

Figure 8:
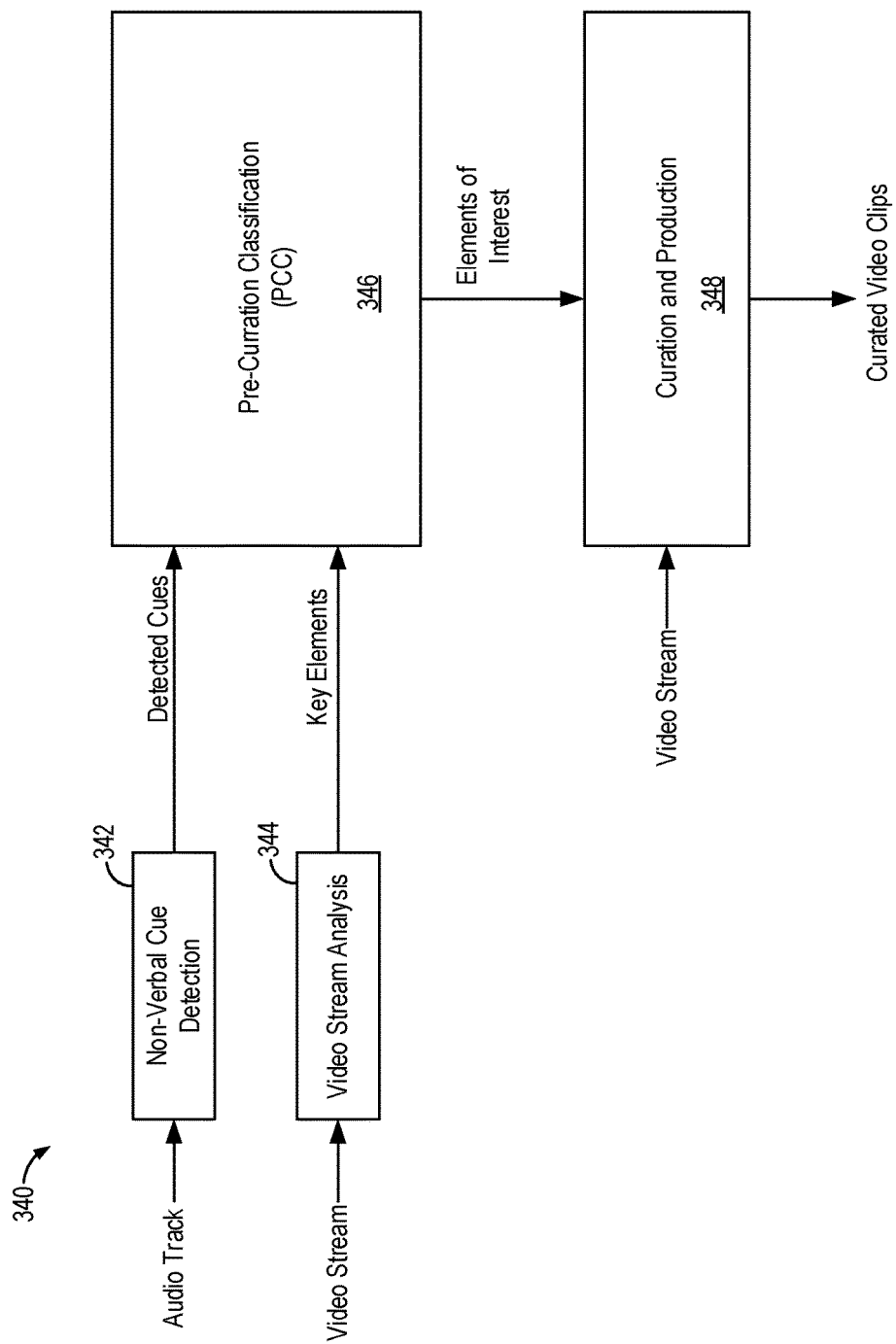
FIG. 8 is a functional diagram of the media stream curation method in a third embodiment.

FIG. 8 is a functional diagram of the media stream curation method in a third embodiment. Referring to FIG. 8, a media stream curation method 340 is configured to receive a single video stream as the media stream to be curated and a single audio track as the associated audio track. The associated audio track is recorded contemporaneously with the video stream using a recording device separate from the video recording device used to record the video stream.

The audio track is provided to a non-verbal cue detection module 342 configured to identify the presence of non-verbal cues relevant to the video stream. In one embodiment, the non-verbal cue detection module 342 implements non-verbal audio analysis as described above to identify sounds of interests from the audio track. The non-verbal cue detection module generates timestamps and metadata associated with the detected non-verbal cues for the audio track. Meanwhile, the video stream is provided to a video stream analysis (VSA) module 344 to recognize and classify key elements of the video stream.

In some embodiments, the outcomes of the non-verbal audio analysis and the video stream analysis are used iteratively to improve mutual outcomes on the basis of correlation between identified visual entities and the non-verbal audio cues.

The results of the non-verbal cue detection from the audio track and the results of the video stream analysis from the video stream are provided to a pre-curation classification (PCC) module 346 which identifies video and speech elements of interest using the detected non-verbal cue and the identified key elements. In some embodiments, elements of interest are identified using a learning classifier based on a deep-learning model or other artificial intelligent learning methods or recognition system.

In some embodiments, the definition of what constitute "element of interest" will vary depending on the type of desired outcome for the curated video stream. For example, each "interest" category may have a dedicated classifier. Furthermore, in some embodiments, a classifier may be "hard coded" or fixed or the classifier may be trained through supervised, unsupervised or other methods of learning and training. The classifier may also evolve over time through unsupervised learning.

The Pre-Curation Classification module 346 generates one or more elements of interest. The identified elements of interest, represented as timestamp and metadata information, are provided to a curation and production module 348. In one example, the timestamp information may consist of a pair of timestamps indicating the start time and the end time associated with the element of interest and the metadata describes the characteristics of the element of interest, such as the type or the nature of the element of interest.

At the curation and production module 348, the video stream is processed on the basis of the output from the pre-curation classification module 346. In one example, the video stream is cut and video clips from the video stream are extracted. In another example, the extracted video clips may be augmented with audio that combines relevant speech elements and music based on the outcomes of the pre-curation classification module 346.

Figure 9:
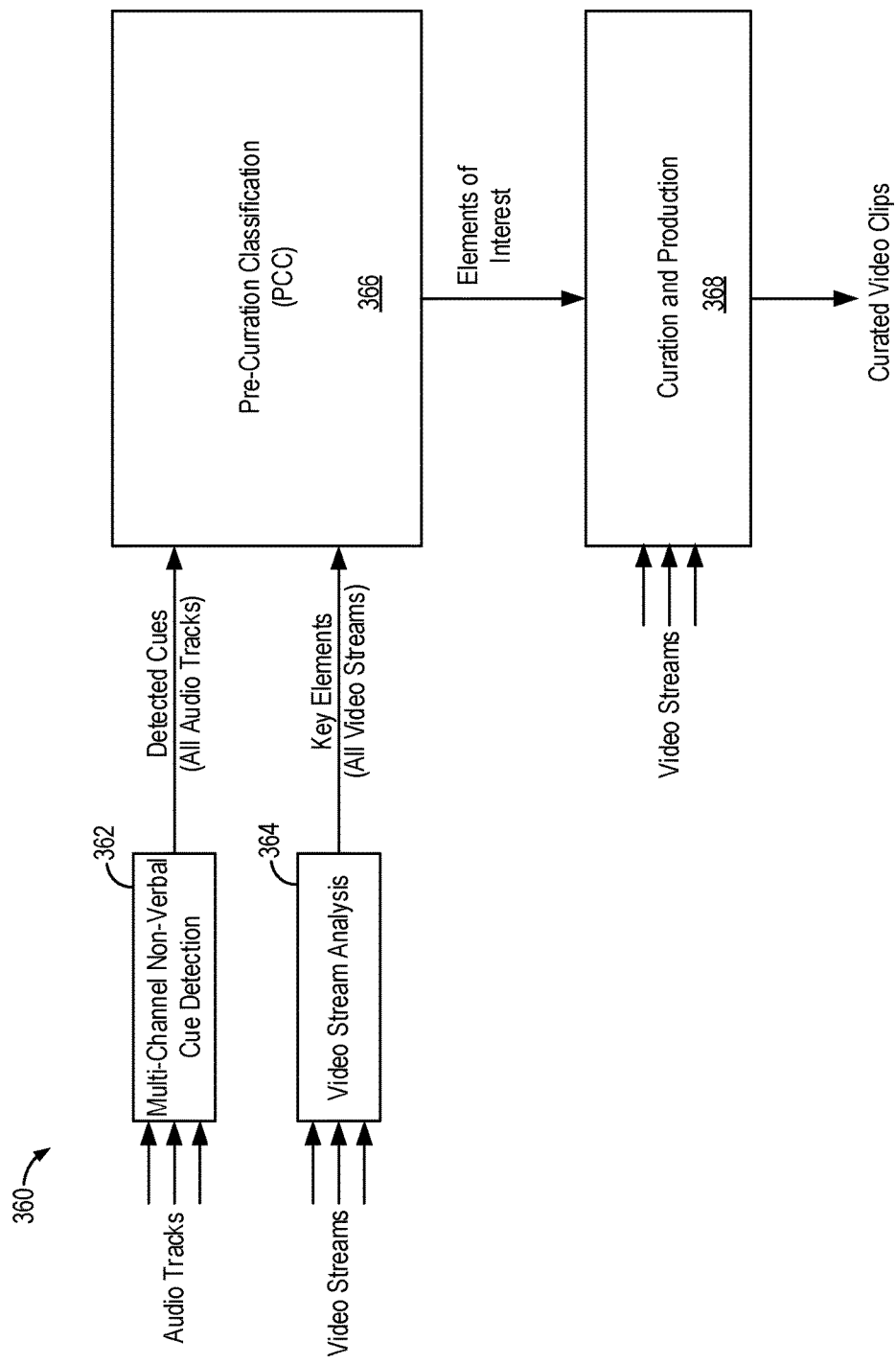
FIG. 9 is a functional diagram of the media stream curation method in a fourth embodiment.

In another embodiment, the media stream curation method is configured to handle multiple media streams and configured to analyze multiple audio tracks. FIG. 9 is a functional diagram of the media stream curation method in a fourth embodiment. Referring to FIG. 9, a media stream curation method 360 is configured to receive multiple video streams as the media streams to be curated and multiple audio track as the associated audio tracks. The associated audio tracks are recorded contemporaneously with the video streams using recording devices separate from the video recording devices used to record the video streams.

The audio tracks are provided to a multi-channel non-verbal cue detection module 362 configured to identify the presence of non-verbal cues across all the audio tracks relevant to the video streams. The multi-channel non-verbal cue detection module generates timestamps and metadata associated with the detected non-verbal cues for each audio track. That is, the non-verbal cue detection is performed for each audio track individually. The non-verbal cue processing involves correlation and mutual-reinforcement of per-stream non-verbal cue detection outcomes to improve the overall extraction outcome. That is, the non-verbal cue processing is a cumulative process. Meanwhile, the video stream is provided to a video stream analysis (VSA) module 364 to recognize and classify key elements of the video stream.

In some embodiments, the outcomes of the non-verbal cue detection and video stream analysis are used iteratively to improve mutual outcomes on the basis of correlation between identified visual entities and non-verbal audio cues.

The results of the non-verbal cue detection across all audio tracks and the results of the video stream analysis across all video streams are provided to a pre-curation classification (PCC) module 366 which identifies video and speech elements of interest using the detected non-verbal cues and the identified key elements. In some embodiments, elements of interest are identified using a learning classifier based on a deep-learning model or other artificial intelligent learning methods or recognition system. More specifically, the classifier outcomes across all video streams are post-processed through a mutual-reinforcement/cross-correlation stage to identify elements of interest across all video streams. While PCC Cross-Correlation module 366 looks at PCC outcomes that are common across all of the video streams, the PCC Cross-Correlation module 366 equally considers and may include outcomes that are not common across the video streams but score highly in terms of (a) confidence of classification within a single video PCC context and (b) metric of speech focus, such as the extent/duration of related discourse.

The Pre-Curation Classification module 366 generates one or more elements of interest. The identified elements of interest, represented as timestamp and metadata information, are provided to a curation and production module 368. In one example, the timestamp information may consist of a pair of timestamps indicating the start time and the end time associated with the element of interest and the metadata describes the characteristics of the element of interest, such as the type or the nature of the element of interest.

At the curation and production module 388, the multiple video streams are processed on the basis of the output from the pre-curation classification module 366. In one example, the video stream is cut and video clips from the video stream are extracted. In another example, the extracted video clips may be augmented with audio that combines relevant speech elements and music based on the outcomes of the pre-curation classification module 366.

In some embodiments, the media stream curation method may be applied to implement the automatic creation of metadata which may be used in various applications including search for particular event types.

In embodiments of the present invention, the media stream curation methods described herein may be applied to the curation of audio only media stream. The audio stream may be conventional audio streams or audio streams with directional sound, enabling the end user to pan around the soundscape.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method to curate a media stream recorded on a first recording device, the method comprising:
   receiving, at a processor, the media stream recorded on the first recording device;
   receiving, at the processor, a first audio track recorded contemporaneously with the media stream using a second recording device separate from the first recording device;
   detecting, at the processor, one or more audio cues in the audio track;
   generating, at the processor, timestamp and metadata information for each audio cue detected in the audio track;
   processing, at the processor, the media stream to identify one or more key elements of the media stream;
   processing, at the processor, the timestamp and metadata information associated with the detected audio cue with the key elements identified in the media stream to identify elements of interest in the media stream;
   identifying, at the processor, one or more elements of interest in response to the processing, each element of interest being represented by timestamp and metadata information;
   processing, at the processor, the media stream using the one or more identified elements of interest to extract media clips from the media stream; and
   generating, at the processor, a curated media stream using the extracted media clips in response to the processing.

2. The method of claim 1, wherein receiving, at the processor, the media stream recorded on the first recording device comprises:
   receiving, at the processor, a video stream or an audio stream as the media stream recorded on the first recording device.

3. The method of claim 1, wherein receiving, at the processor, the media stream recorded on the first recording device comprises:
   receiving, at the processor, a plurality of media streams recorded contemporaneously with each other using the same or different recording devices.

4. The method of claim 1, wherein receiving, at the processor, the first audio track recorded contemporaneously with the media stream using the second recording device separate from the first recording device comprises:
   receiving, at the processor, the first audio track comprising a conversation between two or more users recorded on the second recording device.

5. The method of claim 1, wherein receiving, at the processor, the first audio track recorded contemporaneously with the media stream using the second recording device separate from the to first recording device comprises:
   receiving, at the processor, a plurality of audio tracks, each audio track being recorded contemporaneously with the media stream using a recording device separate from the first recording device, the plurality of audio tracks being recorded on separate recording devices.

6. The method of claim 1, wherein detecting, at the processor, one or more audio cues in the audio track comprises:
   detecting, at the processor, one or more verbal audio cues in the audio track using natural language processing.

7. The method of claim 1, wherein detecting, at the processor, one or more audio cues in the audio track comprises:

detecting, at the processor, one or more non-verbal audio cues in the audio track using sound signal processing and applying a deep learning model.

8. The method of claim 1, wherein processing, at the processor, the media stream to identify one or more key elements of the media stream comprises:
processing, at the processor, the media stream to identify significant visual content or significant audio content as key elements of the media stream.

9. The method of claim 1, wherein processing, at the processor, the timestamp and metadata information associated with the detected audio cue with the key elements identified in the media stream to identify elements of interest in the media stream comprises:
identifying the elements of interest using classifiers of a deep learning model that was previously trained.

10. The method of claim 1, wherein identifying, at the processor, one or more elements of interest in response to the processing, each element of interest being represented by timestamp and metadata information comprises:
representing each element of interest using a pair of timestamps indicating a start time and an end time associated with the element of interest and metadata describing characteristics of the element of interest.

11. The method of claim 1, wherein the processor comprises a processor implemented in the second recording device.

12. The method of claim 1, wherein the second recording device comprises a portable communication device in wireless voice communication with a group of one or more portable communication devices.

13. A system for curating a media stream recorded on a first recording device, the system comprising:
a processor; and
a memory coupled with the processor, wherein the memory is configured to provide the processor with instructions which when executed cause the processor to:
receive the media stream recorded on the first recording device;
receive a first audio track recorded contemporaneously with the media stream using a second recording device separate from the first recording device;
detect one or more audio cues in the audio track;
generate timestamp and metadata information for each audio cue detected in the audio track;
process the media stream to identify one or more key elements of the media stream;
process the timestamp and metadata information associated with the detected audio cue with the key elements identified in the media stream to identify elements of interest in the media stream;
identify one or more elements of interest in response to the processing, each element of interest being represented by timestamp and metadata information;
process the media stream using the one or more identified elements of interest to extract media clips from the media stream; and
generate a curated media stream using the extracted media clips in response to the processing.

14. The system recited in claim 13, wherein the memory is further configured to provide the is processor with instructions which when executed cause the processor to:
receive a video stream or an audio stream as the media stream recorded on the first recording device.

15. The system recited in claim 13, wherein the memory is further configured to provide the processor with instructions which when executed cause the processor to:
receive a plurality of media streams recorded contemporaneously with each other using the same or different recording devices; and
receive a plurality of audio tracks, each audio track being recorded contemporaneously with the media stream using a recording device separate from the first recording device, the plurality of audio tracks being recorded on separate recording devices.

16. The system recited in claim 13, wherein the memory is further configured to provide the processor with instructions which when executed cause the processor to:
detect one or more verbal audio cues in the audio track using natural language processing; and
detect one or more non-verbal audio cues in the audio track using sound signal processing and applying a deep learning model.

17. The system recited in claim 13, wherein the memory is further configured to provide the processor with instructions which when executed cause the processor to:
process the media stream to identify significant visual content or significant audio content as key elements of the media stream.

18. The system recited in claim 13, wherein the memory is further configured to provide the processor with instructions which when executed cause the processor to:
represent each element of interest using a pair of timestamps indicating a start time and an end time associated with the element of interest and metadata describing characteristics of the element of interest.

19. The system recited in claim 13, wherein the processor and the memory are implemented in the second recording device.

20. The system recited in claim 13, wherein the second recording device comprises a portable communication device in wireless voice communication with a group of one or more portable communication devices.

* * * * *

UNITED STATES PATENT AND TRADEMARK OFFICE
CERTIFICATE OF CORRECTION

PATENT NO. : 10,347,299 B2  
APPLICATION NO. : 16/115276  
DATED : July 9, 2019  
INVENTOR(S) : Peter Celinski Page 1 of 1

It is certified that error appears in the above-identified patent and that said Letters Patent is hereby corrected as shown below:

In the Claims

Column 16, Line 9, Claim 14 replace "provide the is processor" with --provide the processor--

Signed and Sealed this  
Third Day of March, 2020

Andrei Iancu  
*Director of the United States Patent and Trademark Office*